United States Patent [19]

Fabrikant et al.

[11] Patent Number: 5,730,114
[45] Date of Patent: Mar. 24, 1998

[54] CHARCOAL GRILLING SYSTEM WITH ELECTRIC IGNITION

[76] Inventors: Marvin Fabrikant; Patricia Fabrikant, both of 5149 Tilden St. N.W., Washington, D.C. 20036

[21] Appl. No.: 783,700

[22] Filed: Jan. 15, 1997

[51] Int. Cl.$^6$ ..................................................... F24B 3/00
[52] U.S. Cl. ..................... 126/25 A; 126/25 B; 219/455
[58] Field of Search .................... 126/25 B, 25 R, 126/25 A; 219/455, 443

[56] References Cited

U.S. PATENT DOCUMENTS

| | | | |
|---|---|---|---|
| 380,077 | 4/1888 | Gebien | 126/25 R |
| 1,987,899 | 1/1935 | Gelsdorf | 44/35 |
| 2,192,732 | 3/1940 | Johnson | |
| 2,540,277 | 2/1951 | Molotzak | |
| 2,841,683 | 7/1958 | Ogle et al. | |
| 2,866,883 | 12/1958 | Borden | 219/35 |
| 2,903,549 | 9/1959 | Joseph | 219/35 |
| 2,922,016 | 1/1960 | Persinger | |
| 2,938,988 | 5/1960 | McCutcheon et al. | 219/32 |
| 2,982,840 | 5/1961 | McCutcheon | 219/35 |
| 2,996,597 | 8/1961 | Persinger et al. | 2219/34 |
| 3,033,191 | 5/1962 | Bonadiman | 126/25 |
| 3,046,381 | 7/1962 | Olswang | 219/32 |
| 3,060,868 | 10/1962 | MacLachlan | |
| 3,153,136 | 10/1964 | Mell | |
| 3,334,214 | 8/1967 | Davidson | |
| 3,339,505 | 9/1967 | Bean | |
| 3,368,544 | 2/1968 | Duncan | 126/25 |
| 3,396,715 | 8/1968 | Allen | 126/25 |
| 3,487,199 | 12/1969 | Hamlin | |
| 3,490,359 | 1/1970 | Seitz | 99/400 |
| 3,529,557 | 9/1970 | Treanor | 110/1 |
| 3,590,755 | 7/1971 | Niemann | 110/1 F |
| 3,628,474 | 12/1971 | Rehwaldt | 110/1 F |
| 3,736,405 | 5/1973 | Bryson, Jr. et al. | 219/270 |
| 3,757,671 | 9/1973 | Warshauer et al. | 99/400 |
| 3,841,211 | 10/1974 | Ellis | 99/482 |
| 3,933,144 | 1/1976 | Bandy | 126/25 R |
| 4,240,398 | 12/1980 | Lindop | 126/25 R |
| 4,406,941 | 9/1983 | Schmerein, Jr. | 219/261 |
| 4,481,408 | 11/1984 | Scheufler | 219/460 |
| 4,554,864 | 11/1985 | Smith et al. | 99/340 |
| 4,649,260 | 3/1987 | Melis et al. | 219/267 |
| 5,174,197 | 12/1992 | Upton | 99/449 |
| 5,197,455 | 3/1993 | Tessien | 126/25 B |
| 5,261,386 | 11/1993 | Burkhart | 126/25 R |
| 5,485,816 | 1/1996 | Cox et al. | 126/25 R |

FOREIGN PATENT DOCUMENTS

| | | |
|---|---|---|
| 219547 | 1/1959 | Australia. |
| 854 327 | 10/1970 | Canada. |
| 2 465 455 | 3/1981 | France. |
| 38 32 829 | 3/1990 | Germany. |
| 63-41730 | 2/1988 | Japan. |
| 5-118547 | 5/1993 | Japan. |
| 7 502 138 | 2/1975 | Netherlands. |
| 726552 | 3/1955 | United Kingdom. |
| 869766 | 6/1961 | United Kingdom. |

*Primary Examiner*—Carroll B. Dority
*Attorney, Agent, or Firm*—Foley & Lardner

[57] ABSTRACT

A charcoal grill is described having an adjustable grate with an electric heating element that supports charcoal briquettes underneath a cooking grill. The grate is adjustable between a lower cooking position and an upper position in contact with the cooking grill which allows cleaning of the cooking grill by heating the adjustable grate to a temperature sufficient to burn off food residue on the cooking grill or cooking of food on the cooking grill in the absence of charcoal briquettes.

12 Claims, 1 Drawing Sheet

CHARCOAL GRILLING SYSTEM WITH ELECTRIC IGNITION

The present invention is directed to a charcoal grilling system with an electric ignition.

BACKGROUND OF THE INVENTION

In the last twenty years or so, outdoor barbecuing has rapidly increased in popularity, and much attention has been given to developing better grills and more convenient ways to initiate combustion of the charcoal fuel.

One such device which has found some success in the marketplace as a charcoal starter is described in U.S. Pat. No. 3,453,975 to Gunter dated Jul. 8, 1969. Gunter uses an open-ended tubular sheet metal housing in the form of a truncated cone, with a perforated grate disposed horizontally halfway up the cone. A lifting handle is affixed to one side of the housing. Charcoal is placed on top of the grate and paper or other readily ignitible material is placed thereunder and ignited to get the charcoal glowing. After the coals are started, the device is lifted by the handle and turned over to dump the glowing coals through the top opening and into the charcoal grill's coal pan or grate.

While this device fulfills its desired purpose, it often requires several feedings of the readily ignitible material to get the fire going; and lifting the device to put new fuel in place is inconvenient and awkward. Also, when the hot coals are dumped, the glowing or still burning remnants of the starting fuel are not easy to dispose of and may be a fire hazard if carelessly handled.

U.S. Pat. No. 3,529,557 to Treanor, dated Sep. 22, 1970, attacks the problem in another way. Treanor employs a mesh basket for containing the charcoal and has integrally attached to the basket an electric heating element. This arrangement is much more convenient, but it still requires lifting the filled container and dumping the hot coals through the top opening of the basket into the coal pan of the charcoal grill. Extreme care must be exercised to avoid accidents during this operation.

U.S. Pat. No. 3,339,505 to Bean, dated Sep. 5, 1967, is somewhat similar to Nelson in operation, but in addition to an electric element also suggests the use of gas and liquid fuels as the ignition means. The suggested device is very sturdily constructed and accordingly could be difficult to handle and dump during use.

U.S. Pat. No. 3,628,474 to Rehwaldt, dated Dec. 21, 1971, suggests a charcoal starting device which consists of a basket having upstanding wire mesh sidewalls and a slot through which a separate electric starting device may be inserted. The employment of a separate basket and a separate starting element requires handling each unit individually necessitating great dexterity and skill. In addition, care must be exercised in setting aside the hot starting element after the coals are ignited.

While each of these prior art devices have contributed to the art, the present invention is believed to provide a number of improvements thereover including a simpler construction and more convenience in handling, as well as some additional safety features.

DETAILED DESCRIPTION OF THE INVENTION

The present invention relates to a charcoal grill with an electric ignition comprising a grate having an electric heating element that supports charcoal briquettes or other combustible material, such as wood, underneath a cooking grill, wherein the grate is adjustable between a lower position suitable for cooking underneath the cooking grill and a higher position in contact with the cooking grill which allows cleaning of the cooking grill by heating the cooking grill to a temperature sufficient to burn off food residue or heating the cooking grill to a temperature sufficient to cook food (without the need for any combustible materials like charcoal). The electrically heated grate serves several purposes including (a) supporting the charcoal briquettes or other combustible material in place underneath a cooking grill during cooking of food, (b) igniting the charcoal briquettes or other combustible material to begin the cooking process, (c) cleaning the cooking grill when adjusted to a position contacting the grill by heating the cooking grill to a temperature sufficient to burn off food residue, and (d) heating the cooking grill to a temperature sufficient to cook food (without the need for any combustible materials like charcoal).

The heating element includes conventional heating elements such as coiled resistance wire. The heating element must be capable of reaching a temperature sufficient to ignite charcoal briquettes or other combustible material and a temperature sufficient to heat the cooking grill to burn off food residue. The power source for the heating element may be a battery, including batteries which are rechargeable by means of solar panels, preferably solar panels can be placed in the lid of the grill, or standard electrical outlets, e.g., 120 V wall sockets. Also, the interior surface of the lid of the grill may include means for recycling heat rising off of the cooking grill to the heating element.

Figure 1:
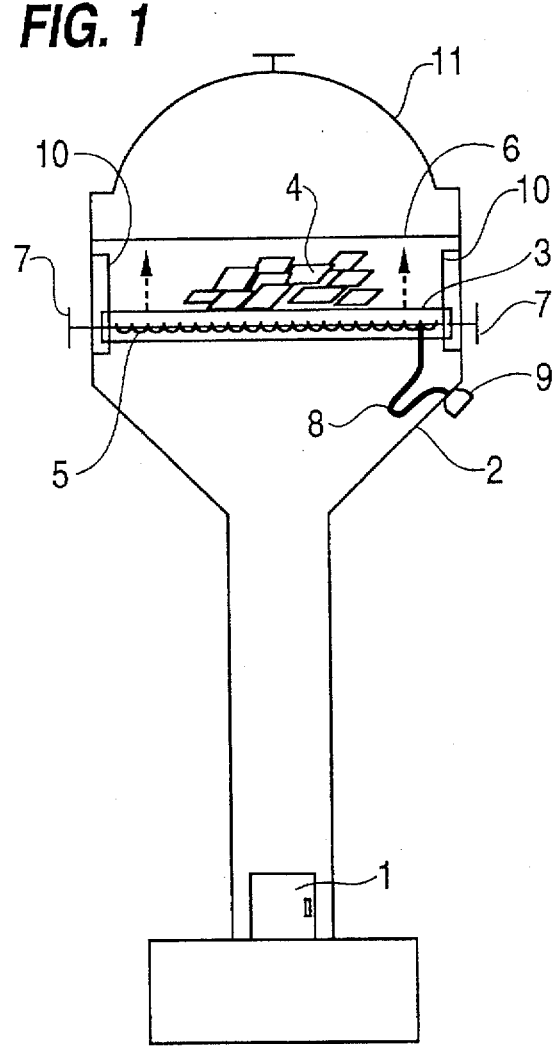
FIG. 1 is a front view of an embodiment of the present grilling system.

Referring to FIG. 1, one embodiment of the grilling system of the present invention includes a housing 2 with a grill cover 11 that encloses a cooking grill 6 and an adjustable grate 3. The adjustable grate 3 may be made of nichrome or ceramic- or porcelain-coated metal and includes an electric heating element 5, which is powered by an electrical supply cord 8 that connects to an external power source 9, which may be a plug to accommodate standard 120 V extension cords or batteries. The adjustable grate 3 contains openings small enough to prevent charcoal briquettes 4 or combustible materials from falling through but large enough to allow ashes to fall through when the adjustable grate 3 is shaken. An ash collection door 1 at the bottom of the housing 2 can be opened to expel ashes. The adjustable grate 3 can be grasped by handles 7 and moved upward along rails 10 after cooking is complete to a position in contact with the cooking grill 6, allowing the adjustable grate 3 to heat the cooking grill 6 to a temperature suitably high to burn off food residue left on the cooking grill 6.

Figure 2:
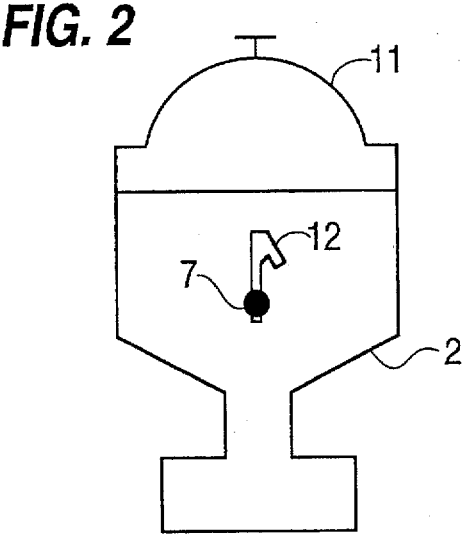
FIG. 2 is a side view of the embodiment of FIG. 1.

FIG. 2 is a side view of the embodiment in FIG. 1, in which the grill cover 11 is shown and a slot 12 for handle 7 is shown 5 on the side of housing 2. The slot 12 includes a notch to support the handle 7 in cleaning position.

It will be apparent to those skilled in the art that various modifications and variations can be made to the compositions and processes of this invention. Thus, it is intended that the present invention cover such modifications and variations, provided they come within the scope of the appended claims and their equivalents.

The disclosures of all publications cited above are expressly incorporated herein by reference in their entireties to the same extent as if each were incorporated by reference individually.

We claim:

1. A device for grilling food comprising a cooking grill and an adjustable grate having a heating element, means supporting the adjustable grate such that it may be adjustable between a lower cooking position to support combustible materials underneath the cooking grill and an upper position in contact with the cooking grill.

2. The device as claimed in claim 1 further comprising a power supply cord for the heating element.

3. The device as claimed in claim 1 wherein the heating element is coiled electrical resistance wire.

4. The device as claimed in claim 1 further comprising a housing enclosing the cooking grill and adjustable grate, said housing having internal vertical rails on which the adjustable grate is mounted for adjustment beneath the cooking grill.

5. The device as claimed in claim 4, further comprising a grill cover.

6. The device as claimed in claim 5, further comprising an external handle attached through a slot in the housing to the adjustable grate.

7. The device as claimed in claim 6, wherein the slot includes a notch just below the cooking grill to support the external handle of the adjustable grate in the upper position.

8. The device as claimed in claim 7, wherein the housing further comprises an ash removal door in a lower region thereof.

9. A method for grilling food on a cooking grill comprising providing an adjustable grate having a heating element underneath the cooking grill, means supporting the adjustable grate such that it may be adjustable between a lower cooking position to support combustible materials underneath the cooking grill and an upper position in contact with the cooking grill and igniting combustible materials on top of the adjustable grate in the lower cooking position by heating the heating element.

10. The method of claim 9 further comprising, after cooking is complete, adjusting the adjustable grate to the upper position in contact with the cooking grill and heating the adjustable grate to a temperature sufficient to burn off food residue present on the cooking grill.

11. A method for grilling food on a cooking grill comprising providing an adjustable grate having a heating element underneath the cooking grill, adjusting the adjustable grate between a lower cooking position to support combustible materials underneath the cooking grill and an upper position in contact with the cooking grill, and heating the adjustable grate to a temperature sufficient to cook food on the cooking grill.

12. The method of claim 11 further comprising, after removing cooked food from the cooking grill, heating the adjustable grate to a temperature sufficient to burn off food residue from the cooking grill.

* * * * *